US005244495A

United States Patent [19]

Doi et al.

[11] Patent Number: 5,244,495

[45] Date of Patent: Sep. 14, 1993

[54] ADDITIVE FOR LITHOGRAPHIC DAMPENING SOLUTION AND USE THEREOF

[75] Inventors: Kenichi Doi; Shintaro Yamaoka; Yoshitake Nagayama; Masanori Fujiki; Shinichi Goto; Katsuhiro Ohsaki; Takeya Sakai, all of Tokyo, Japan

[73] Assignees: Toyo Ink Manufacturing Co., Ltd.; Kao Corporation; Toppan Printing Co., Ltd., all of Tokyo, Japan

[21] Appl. No.: 854,854

[22] Filed: Mar. 20, 1992

[30] Foreign Application Priority Data

Mar. 22, 1991 [JP] Japan .................................... 3-83656
Feb. 20, 1992 [JP] Japan .................................... 4-70209

[51] Int. Cl.[5] ................................................ C09K 3/18
[52] U.S. Cl. .......................................... 106/2; 101/451
[58] Field of Search ............................. 106/2; 101/451

[56] References Cited

U.S. PATENT DOCUMENTS

| | | | |
|---|---|---|---|
| 4,278,567 | 7/1981 | Fadner | 106/2 |
| 4,560,410 | 12/1985 | Burns et al. | 106/2 |
| 4,798,627 | 1/1989 | Schmitt et al. | 106/14.25 |
| 4,854,969 | 8/1989 | Bassemir et al. | 106/2 |
| 5,064,749 | 11/1991 | Matsumoto et al. | 106/2 |

FOREIGN PATENT DOCUMENTS

| | | |
|---|---|---|
| 0412455 | 2/1991 | European Pat. Off. . |
| 363188 | 3/1991 | Japan . |
| 390389 | 4/1991 | Japan . |
| 41091 | 1/1992 | Japan . |

OTHER PUBLICATIONS

Grant & Hackh's Chemical Dictionary, 5th Ed., 1988, p. 112.

*Primary Examiner*—Helene Klemanski
*Attorney, Agent, or Firm*—Sughrue, Mion, Zinn, Macpeak & Seas

[57] ABSTRACT

An additive for a lithographic dampening solution is disclosed, which comprises:

(a) a compound represented by the following formula (A):

$$R-O-(CH_2\overset{\overset{CH_3}{|}}{C}HO)_n-H \quad (A)$$

wherein R represents a methyl group, an ethyl group, an n-propyl group or an isopropyl group, and n represents an integer of 1 to 4; and (b) an alcohol having an HLB of 7.0 to 15.0 which is selected from the group consisting of primary or tertiary alkoxyalcohols having an alkoxy group containing from 1 to 6 carbon atoms, primary or tertiary alkanols, saturated straight-chain polyhydric alcohols containing from 2 to 6 carbon atoms and diethylene glycol monoalkyl ethers. A dampening solution for lithographic printing comprising water and the additive is also disclosed.

2 Claims, No Drawings

ADDITIVE FOR LITHOGRAPHIC DAMPENING SOLUTION AND USE THEREOF

FIELD OF THE INVENTION

This invention relates to an additive for a lithographic dampening solution which can be used as a substitute for conventional additives for lithographic dampening solutions containing isopropyl alcohol as a main component, and to a lithographic dampening solution comprising the additive and which can be used as a substitute for conventional lithographic dampening solutions containing isopropyl alcohol.

BACKGROUND OF THE INVENTION

Lithographic printing is a printing system in which printing is conducted using a press plate with ink-receptive image areas and hydrophilic ink-repellent non-image areas. Namely, ink is applied to the sensitized areas, a dampening solution is applied to the hydrophilic areas and printing is made by utilizing mutual repulsion between ink and the dampening solution. It is important to feed the ink and the dampening solution to be applied to the surface of the press plate with proper ink-dampening solution balance. When the amount of the dampening solution applied is too large, ink is intensively emulsified and failure in transfer occurs, whereas when the amount of the dampening is too small, ink adheres to the non-image areas and scumming occurs.

For better control of the balance between ink and the dampening solution, dampening solutions usually contain isopropyl alcohol (IPA) to reduce surface tension, and further, various hydrophilic materials such as gum arabic, carboxymethyl cellulose (CMC), citric acid and various surfactants; an acid such as phosphoric acid as an affinitizing agent to remove oxides on the surface of the plate; and ammonium bichromate or nitrates as a corrosion inhibitor for the plate. IPA has been widely used because it has advantages in that, since IPA can reduce the surface tension of the dampening solution, the wetting of the hydrophilic non-image areas becomes good and the viscosity of the dampening solution is increased to thereby allow the smooth feed of the dampening solution to the surface of the plate to be made.

However, IPA comes under alcohols of the class 4 hazardous material specified in the Low of Japan because it is highly flammable substance, and, thus it must be handled with the greatest possible care against fire. Further, IPA is the class 2 organic solvent specified in "Yuki-Yozai Chudoku Yobo Kisoku" (the Rules for Prevention of Organic Solvent Poisoning) of Japan (hereinafter referred to as the "Rule for Organic Solvent") because it is highly harmful substance for the human body. Furthermore, the dampening solutions usually contain about 5 to 20% by weight of IPA and hence it is necessary to provide an apparatus for purifying working atmosphere.

To this end, JP-B-55-19757 (the term "JP-B" as used herein means an "examined Japanese patent publication") proposes dampening solutions for lithographic printing which contain propylene oxide or ethylene oxide alkyl ether surfactant in place of IPA, and JP-A-63-25093 (the term "JP-A" as used herein means an "unexamined published Japanese patent application") proposes dampening solutions for lithographic printing which contain polyethylene oxide surfactants in place of IPA.

Since the above-described surfactants are relatively safe for the human body so that the Rule for Organic Solvent is not applied to them. Furthermore, the surfactant is normally used in a content of 0.1 to 0.5% by weight in the dampening solution and the surfactant can certainly reduce the surface tension of the dampening solution with such a content. However, the transfer of the dampening solutions from a pan is poor in comparison with those containing IPA and the wetting of the hydrophilic non-image areas of the plate is not satisfactory.

Further, JP-A-3-63188 proposes dampening solutions containing ethylene oxide and/or propylene oxide adducts of 2-ethyl-1,3-hexanediol or ethylene oxide and/or propylene oxide adducts of acetylene alcohol or acetylene glycol (i.e., ether glycols which are alcohol derivatives). However, 2-ethyl-1,3-hexanediol itself, in particular, has poor solubility in water, and further the lipophilic (hydrophobic) propylene oxide adducts are scarcely soluble in water. Accordingly, the surface tension can not be lowered.

The surface tension can certainly be reduced by adding 0.5 to 50% by weight, based on the total weight of the solution, of the ethylene oxide or propylene oxide adducts of these compounds. However, the transfer of the dampening solutions from a pan is poor in comparison with those containing IPA and the wetting of the hydrophilic non-image areas of the plate is not satisfactory and, as a result, scumming on prints occurs.

Generally, ethylene glycol monobutyl ether is used as the organic solvent which is a substitute for IPA, and additives for lithographic dampening solutions which contain the same are on the market. Ethylene glycol monobutyl ether itself is a harmful substance for the human body so that it comes under the class 2 organic solvent specified in the Rule for Organic Solvent, but the dampening solution containing the same is not applied with the Rule for Organic Solvent because the dampening solutions usually contain it at a concentration of only 0.1 to 3% by weight. However, when ethylene glycol monobutyl ether is to be handled at a concentration of higher than 5% by weight in the preparation of the additives for the dampening solutions or in the adjustment of the dampening solutions, it is necessary to take an appropriate measure for preventing the worker from the hazard of the compound under the Rule for Organic Solvent. When ethylene glycol monomethyl ether is used as a glycol ether, the same measure must be taken. Accordingly, the manufacturers of the additives for the dampening solutions and the users thereof must take an appropriate measure for purifying working atmosphere.

SUMMARY OF THE INVENTION

Accordingly, an object of the present invention is to provide an additive for a lithographic dampening solution which can substitute for IPA and is highly safe, and to provide a dampening solution containing the additive.

Another object of the present invention is to provide an additive for a lithographic dampening solution and a dampening solution containing the same which is excellent in printability with using an appropriate amount of an organic solvent of high safety.

Thus, the present invention provides in one aspect an additive for a lithographic dampening solution which additive comprises a compound represented by the following formula (A):

$$R-O-(CH_2\overset{CH_3}{\overset{|}{C}}HO)_n-H \qquad (A)$$

wherein R represents a methyl group, an ethyl group, an n-propyl group or an isopropyl group, and n represents an integer of 1 to 4; and an alcohol having an HLB of from 7.0 to 15.0 which is selected from the group consisting of primary or tertiary alkoxyalcohols having an alkoxy group containing from 1 to 6 carbon atoms, primary or tertiary alkanols, saturated straight-chain polyhydric alcohols containing from 2 to 6 carbon atoms and diethylene glycol monoalkyl ethers.

The present invention provides in another aspect a dampening solution for lithographic printing which comprises the additive and water.

DETAILED DESCRIPTION OF THE INVENTION

An additive for a dampening solution of the present invention comprises a compound of formula (A) (component (a)) and an alcohol having an HLB of from 7.0 to 15.0 which is selected from the group consisting of primary or tertiary alkoxyalcohols having an alkoxy group containing from 1 to 6 carbon atoms, primary or tertiary alkanols, saturated straight-chain polyhydric alcohols containing from 2 to 6 carbon atoms and diethylene glycol monoalkyl ethers (component (b)). The term "additive" as used herein means a composition comprising these components (a) and (b). Optionally, the additive may be provided in the form of a concentrate comprising components (a) and (b) and an appropriate amount of water.

The term "dampening solution" as used herein means a solution formulated by diluting the additive with water to a concentration at which the solution is practically used in printing.

The dampening solution may optionally contain other auxiliary ingredients. The auxiliary ingredients may be previously added to the additive for the dampening solution.

The term "HLB" as used herein refers to hydrophilic lipophilic balance. The HLB value can be determined, for example, by the method described in Masahide Okada, *Yukagaku* (Oil Chemistry), 7, 434 (1958).

Specific examples of the primary or tertiary alcohols having an alkoxy group containing from 1 to 6 carbon atoms and an HLB of 7.0 to 15.0 which can be used in the present invention include 3-methyl-3-methoxybutanol and monomethyl, monoethyl, mono-n-propyl, mono-sec-butyl, mono-tert-butyl and monoisobutyl ethers of ethylene glycol. Among them, 3-methyl-3-methoxybutanol and ethylene glycol mono-tert-butyl ether are preferred from the viewpoint of safety.

As to the primary or tertiary alkanols having an HLB of 7.0 to 15.0, those containing 1 to 6 carbon atoms are preferred. Specific examples thereof include ethyl alcohol, n-propyl alcohol, n-butanol, tert-butanol and isobutanol with tert-butanol and n-propyl alcohol being preferred.

Specific examples of the alkyl group of the diethylene glycol monoalkyl ethers having an HLB of 7.0 to 15.0 include methyl, ethyl, n-propyl, isopropyl, n-butyl, sec-butyl, tert-butyl and isobutyl. Among them, tert-butyl and n-propyl are preferred.

The main chain of the saturated straight-chain polyhydric alcohols containing from 2 to 6 carbon atom and an HLB of 7.0 to 15.0 may either exclusively contain carbon atoms or further contain an oxygen atom, a nitrogen atom or a sulfur atom, but it does not contain any unsaturated bond on the carbon chain. Specific examples of the polyhydric alcohol include ethanediol, propanediol, butanediol, diethylene glycol, dipropylene glycol, glycerin and diglycerin.

Among the above-described alcohols, 3-methyl-3-methoxybutanol is an isomer of ethylene glycol monobutyl ether, but it is very low-toxic. Therefore it can preferably be used in the present invention for its high safety as compared with ethylene glycol monobutyl ether.

Lipophilicity of a compound of an HLB value of lower than 7.0 tends to high so that such a compound become water-insoluble, thereby a homogeneous dampening solution can not be obtained if such a compound is employed as component (b). On the other hand, if an HLB value of a compound is higher than 15.0, an ability of lowering the surface tension of the compound is lowered, hence the wetting of the hydrophilic non-image areas of the plate with the dampening solution containing such compound as component (b) is not satisfactory.

Accordingly, alcohols of an HLB value range of from 7.0 to 15.0 are preferably employed in the present invention, and alcohols of an HLB value range of from 7.0 to 13.0 are more preferably employed in the present invention.

The dampening solution of the present invention usually contain the above-described alcohol of an HLB of from 7.0 to 15.0 in an amount of from 0.01 to 5% by weight based on total weight of the dampening solution.

When the amount of the alcohol is less than 0.01% by weight, ink is liable to adhere to the hydrophilic non-image areas. On the other hand, when the amount is more than 5% by weight, failure in drying on the printed surface and offset are liable to occur. Thus, such an amount is not preferred. The amount of the alcohol is preferably from 0.05 to 3% by weight, more preferably from 0.1 to 1.5% by weight.

When R in a compound of formula (A) is a butyl group or a higher carbon number group and n is 5 or larger, solubility of the compound in water tends to be poor and hence a homogeneous product can hardly be obtained. Further, the boiling point of the resulting dampening solution is raised, thereby failure in drying on the printed surface and offset tend to occur.

Specific examples of the compound of formula (A) include propylene glycol monomethyl ether, propylene glycol monoethyl ether, propylene glycol mono-n-propyl ether, propylene glycol monoisopropyl ether, dipropylene glycol monomethyl ether, dipropylene glycol monoethyl ether, dipropylene glycol mono-n-propyl ether, dipropylene glycol monoisopropyl ether, tripropylene glycol monomethyl ether, tripropylene glycol mono-n-propyl ether, tripropylene glycol monoisopropyl ether, tetrapropylene glycol monomethyl ether, tetrapropylene glycol monoethyl ether, tetrapropylene glycol mono-n-propyl ether and tetrapropylene glycol monoisopropyl ether.

Among them, propylene glycol monomethyl ether, propylene glycol mono-n-propyl ether, propylene glycol monoisopropylene ether, dipropylene glycol monoethyl ether, dipropylene glycol monoisopropyl ether, tripropylene glycol monoethyl ether, tripropylene glycol monoisopropyl ether, tetrapropylene glycol monomethyl ether and tetrapropylene glycol monoisopropyl ether are preferred.

The dampening solution of the present invention contains the compounds of formula (A) in an amount of from 0.01 to 5% by weight based on the total weight of the dampening solution. When the amount of the compound (A) is less than 0.01% by weight, ink tends to adhere to the hydrophilic non-image areas. On the other hand, when the amount is more than 5% by weight, failure in drying on the printed surface and offset tend to occur. The amount of the compound (A) is preferably from 0.05 to 3% by weight, more preferably from 0.1 to 1.5% by weight.

When 1% by weight of one component of the additive for lithographic dampening solution according to the present invention, for example, tetrapropylene glycol monomethyl ether which is one embodiment of the compounds of formula (A), is contained in a tap water, the surface tension can be reduced to a level equal to or more than that of a tap water containing 5% by weight of IPA. Accordingly, when the compound of formula (A) alone or in combination with an appropriate amount of phosphoric acid or gum arabic is contained in a tap water, the resulting solution can be used as a dampening solution for lithographic printing. Similarly, when 3% by weight of one component of the additive of the present invention, i.e., one member of the alcohols having an HLB of from 7.0 to 15.0, for example, 3-methyl-3-methoxybutanol is contained in a tap water, the surface tension can be reduced to a level equal to or more than that of a tap water containing 5% by weight of IPA. Accordingly, when the alcohol alone or in combination with an appropriate amount of phosphoric acid or gum arabic is contained in a tap water, the resulting solution can also be used as a dampening solution for lithographic printing.

The present inventors have found that when the compound of formula (A) and the above-described alcohol having an HLB of 7.0 to 15.0 are used in combination, a very excellent performance can be obtained. The present invention has been accomplished on the basis of the above finding. Namely, it has been found that when these two components are used in combination, there are many advantages that an ink-water balance can easily be controlled, tone and gradation can quickly be matched, the dots of prints can be well-reproduced, the stability of color tone is good, and further a scumming phenomenon, which conventionally causes troubles, does not occur. Although details of the mechanism that the combination of these components gives excellent performances as described above have not been revealed, such unexpected excellent results are considered to be due to the favorable function of the combination of the components on the dynamic surface tension of the dampening solution and the emulsifiability of ink.

The additive for the dampening solution and the dampening solution of the present invention may contain gum arabic, dextrin, sodium alginate, carboxymethyl cellulose, hydroxymethyl cellulose, polyvinyl alcohol, polyvinyl pyrrolidone polyacrylic acid, polyacrylamide and the like as a desensitizing agent to protect the surface of the plate in an amount to give a content of from 0.01 to 0.1% by weight in the dampening solution. Furthermore, nitric acid, sulfuric acid, phosphoric acid, citric acid, acetic acid, tartaric acid or sodium, potassium or magnesium salts thereof, or ammonium dichromate may be present in an amount to give a content of from 0.01 to 0.5% by weight in the dampening solution on anti-scumming purpose or pH controlling purpose. Furthermore, conventional surfactants such as anionic, cationic or nonionic surfactants may be present in an amount to give a content of 0.01 to 0.5% by weight in the dampening solution on surface tension reducing purpose. In addition, antiseptics and as wetting agent various long-chain alcohols such as tridecanol can optionally be added to the additive or the dampening solution of the present invention.

The additive for the dampening solution of the present invention can be obtained by mixing the compound of formula (A) and the alcohol having a specified HLB value, and if necessary, and water so as to give an amount of the compound of formula (A) and an amount of the alcohol having a specified HLB value of from 0.1 to 30% by weight, respectively; adding, if necessary, an acid, a salt, a water-soluble high-molecular compound, and the like thereto; and mixing them with stirring to form a uniform aqueous solution. Alternatively, the compound of formula (A) and the alcohol having a specified HLB value may be added to water containing, if necessary, an acid, a salt, and the like and the resulting mixture may be mixed with stirring. There is no particular limitation with regard to the mixing and stirring method. The dampening solution of the present invention can be obtained by mixing the additive of the present invention with water so as to give specified amounts of the components.

The present invention is illustrated in detail by reference to the following nonlimiting examples and comparative examples.

Additives, A to J solutions, for a dampening solution according to the present invention and comparative additives, K to T solutions, were prepared with formulations indicated in Table 1. Dampening solutions were prepared from these additives with formulations indicated in Table 2.

Examples 1 to 8 relate to dampening solutions containing one member of the compounds of formula (A) and members of the alcohol of an HLB of 7.0 to 15.0 of the present invention, Example 9 relates to a dampening solution containing two members of the compounds of formula (A) and 3-methyl-3-methoxybutanol, and Example 10 relates a dampening solution containing one member of the compounds of formula (A) and two members of the alcohols having an HLB of 7.0 to 15.0 of the present invention.

Comparative Example 1 relates to a dampening solution containing the compound of formula (A) alone as the principal component, Comparative Example 2 relates to a dampening solution containing 3-methyl-3-methoxybutanol alone as the principal component, Comparative Example 3 relates to a dampening solution containing a principal component which is outside the scope of the present invention, Comparative Example 9 relates to a dampening solution containing 5% by weight of IPA, and Comparative Example 10 relates to a dampening solution containing a nonionic surfactant described in JP-A-3-63188.

The pH and surface tension (measured by Wilhelmy's method) of the dampening solutions of these Examples and Comparative Examples and the results of printing test are shown in Table 3.

The pH value was measured thrice at 25° C. by using a Ph meter (MODEL HM-7E, manufactured by Toa Denpa Kogyo Co., Ltd.) and expressed in the mean value.

Surface tension was measured thrice at 25° C. by using a surface tension meter (KYOWA CBVP SURFACE TENSIOMETER A-3, trade name, manufactured by Kyowa Kagaku Co., Ltd.) and expressed in the mean value.

PRINTING TEST CONDITIONS

Printing press:

Mitsubishi Lithopia L-400 (B-B type offset rotary printing press, manufacture by Mitsubishi Heavy Industries, Ltd.)

Printing speed: 400 rpm Paper: Mitsubishi Pearl Coat A (66.5K) Dampening mechanism: Dahlgren system Temperature and humidity: 20° to 22° C., 40 to 50% PH Ink WD Excel new magenta-M (manufactured by Toyo Ink Mfg. Co., Ltd.)

The number of printed copies: 20,000 sheets

TABLE 1

| | | Additive | | | | | | |
|---|---|---|---|---|---|---|---|---|
| | HLB | A | B | C | D | E | F | G |
| Tap water | — | 57 | 57 | 57 | 57 | 57 | 57 | 42 |
| Phosphoric acid | — | 1 | 1 | 1 | 1 | 1 | 1 | 1 |
| Magnesium nitrate | — | 1 | 1 | 1 | 1 | 1 | 1 | 1 |
| CMC | — | 1 | 1 | 1 | 1 | 1 | 1 | 1 |
| Methyl*1 | — | 20 | | | | | | |
| Ethyl*1 | | | 20 | | | | | |
| n-Propyl*1 | | | | 20 | | | | |
| Isopropyl*1 | | | | | 20 | | | |
| Methyl*2 | | | | | | 20 | 15 | 20 |
| Isopropyl*3 | | | | | | | | |
| Ethyl*4 | | | | | | | | |
| 3-Methyl-3- | 7.4 | | | | 20 | 20 | 25 | 35 |
| | 20 | | | | | | | |
| methoxy-butanol | | | | | | | | |
| Methyl carbitol | 9.1 | | 20 | | | | | |
| Glycerin | 11.3 | | | 20 | | | | |
| Pentanol | 6.5 | | | | | | | |
| Sorbitol | 15.6 | | | | | | | |
| Emulgen PP230 | 7.5 | | | | | | | |
| 2-Ethyl-1,3-hexanediol propylene oxide adducts (10 mol) | | | | | | | | |
| 2-Ethyl-1,3-hexanediol ethylene oxide adducts (10 mol) | | | | | | | | |
| 4-Hydroxy-4-methyl-2-pentanone | | | | | | | | |
| | HLB | H | I | J | K | L | M | N |
| Tap water | — | 57 | 57 | 57 | 57 | 57 | 57 | 57 |
| Phosphoric acid | — | 1 | 1 | 1 | 1 | 1 | 1 | 1 |
| Magnesium nitrate | — | 1 | 1 | 1 | 1 | 1 | 1 | 1 |
| CMC | — | 1 | 1 | 1 | 1 | 1 | 1 | 1 |
| Methyl*1 | — | | 10 | | | | | |
| Ethyl*1 | | | | | | | | |
| n-Propyl*1 | | | | | | | | |
| Isopropyl*1 | | | | | | | | |
| Methyl*2 | | | 10 | 20 | | | | |
| Isopropyl*3 | | 20 | | | 40 | | | 20 |
| Ethyl*4 | | | | | | | 20 | |
| 3-Methyl-3-methoxy-butanol | 7.4 | 20 | 20 | 10 | | 40 | 20 | |
| Methyl carbitol | 9.1 | | | 10 | | | | |
| Glycerin | 11.3 | | | | | | | |
| Pentanol | 6.5 | | | | | | | 20 |
| Sorbitol | 15.6 | | | | | | | |
| Emulgen PP230 | 7.5 | | | | | | | |
| 2-Ethyl-1,3-hexanediol propylene oxide adduct (10 mol) | | | | | | | | |
| 2-Ethyl-1,3-hexanediol ethylene oxide adduct (10 mol) | | | | | | | | |
| 4-Hydroxy-4-methyl-2-pentanone | | | | | | | | |
| | HLB | O | P | Q | R | S*5 | T | |
| Tap water | — | 57 | 57 | 57 | 87 | 57 | 57 | |
| Phosphoric acid | — | 1 | 1 | 1 | 1 | 1 | 1 | |
| Magnesium nitrate | — | 1 | 1 | 1 | 1 | 1 | 1 | |

TABLE 1-continued

| | | Additive | | | | | |
|---|---|---|---|---|---|---|---|
| CMC | — | 1 | 1 | 1 | 1 | 1 | 1 |
| Methyl*1 | — | | | | | | |
| Ethyl*1 | | | | | | | |
| n-Propyl*1 | | | | | | | |
| Isoprcpyl*1 | | | | | | | |
| Methyl*2 | | | 20 | | | | |
| Isopropyl*3 | | 20 | 20 | | | | |
| Ethyl*3 | | | | | | | |
| 3-Methyl-3-methoxy-butanol | 7.4 | | | 20 | | | |
| Methyl carbitol | 9.1 | | | 20 | | | |
| Glycerin | 11.3 | | | | | | |
| Pentanol | 6.5 | | | | | | |
| Sorbitol | 15.6 | 20 | | | | | |
| Emulgen PP230 | 7.5 | | | | 10 | | |
| 2-Ethyl-1,3-hexanediol propylene oxide adduct (10 mol) | | | | | | 30 | |
| 2-Ethyl-1,3-hexanediol ethylene oxide adduct (10 mol) | | | | | | | 30 |
| 4-Hydroxy-4-methyl-2-pentanone | | | | 10 | 10 | | |

Notes:
*1 "Methyl", "ethyl", "n-propyl" and "isopropyl" mean dipropylene glycol monomethyl ether, dipropylene glycol monoethyl ether, dipropylene glycol mono-n-propyl ether and dipropylene glycol monoisopropyl ether, respectively.
*2 "Methyl" means tetrapropylene glycol monomethyl ether.
*3 "Isopropyl" means propylene glycol monoisopropyl ether.
*4 "Ethyl" indicates hexapropylene glycol monoethyl ether.
*5 2-Ethyl-1,3-hexanediol propylene oxide adduct (10 mol) is insoluble in water.
*6 Emulgen PP-23 is the trade name of polyoxyethylene-polyoxypropylene block copolymer manufactured by Kao Corporation.
*7 Numerical values in the Table except those for HLB are % by weight.

TABLE 2

| | 1 | 2 | 3 | 4 | 5 | 6 | 7 | 8 | 9 | 10 |
|---|---|---|---|---|---|---|---|---|---|---|
| | Example | | | | | | | | | |
| Tap water | 98 | 98 | 98 | 98 | 98 | 98 | 98 | 98 | 98 | 98 |
| Additive A | 2 | | | | | | | | | |
| Additive B | | 2 | | | | | | | | |
| Additive C | | | 2 | | | | | | | |
| Additive D | | | | 2 | | | | | | |
| Additive E | | | | | 2 | | | | | |
| Additive F | | | | | | 2 | | | | |
| Additive G | | | | | | | 2 | | | |
| Additive H | | | | | | | | 2 | | |
| Additive I | | | | | | | | | 2 | |
| Additive J | | | | | | | | | | 2 |
| | Comparative Example | | | | | | | | | |
| Tap Water | 98 | 98 | 98 | 98 | 98 | 98 | 98 | 99 | 94.8 | 98 |
| Additive K | 2 | | | | | | | | | |
| Additive L | | 2 | | | | | | | | |
| Additive M | | | 2 | | | | | | | |
| Additive N | | | | 2 | | | | | | |
| Additive O | | | | | 2 | | | | | |
| Additive P | | | | | | 2 | | | | |
| Additive Q | | | | | | | 2 | | | |
| Additive R | | | | | | | | 1 | | |
| Additive T | | | | | | | | | | 2 |
| IPA | | | | | | | | | 5 | |
| Phosphoric Acid | | | | | | | | | 0.02 | |

Note: 1) Numerical values in the Table are % by weight.
2) The dampening solutions could not be prepared from the composition of Comparative Examples 3 and 4 since compatibility of the components was poor and homogeneous solution could not be obtained.
3) Additive S was insoluble in water, thus it was not subjected to the subsequent tests.

TABLE 3

| | pH | Surface Tension (dyne/cm) | Printing Test |
|---|---|---|---|
| Example 1 | 4.3 | 53.3 | No scumming |
| Example 2 | 4.3 | 51.2 | No scumming |
| Example 3 | 4.2 | 49.1 | No scumming |
| Example 4 | 4.3 | 49.7 | No scumming |

TABLE 3-continued

| | pH | Surface Tension (dyne/cm) | Printing Test |
|---|---|---|---|
| Example 5 | 4.1 | 50.5 | No scumming |
| Example 6 | 4.4 | 50.9 | No scumming |
| Example 7 | 4.4 | 50.4 | No scumming |
| Example 8 | 4.1 | 48.3 | No scumming |
| Example 9 | 4.3 | 50.8 | No scumming |
| Example 10 | 4.4 | 50.4 | No scumming |
| Comparative Example 1 | 4.4 | 48.8 | 4000 |
| Comparative Example 2 | 4.5 | 60.1 | 4000 |
| Comparative Example 3 | — | — | — |
| Comparative Example 4 | — | — | — |
| Comparative Example 5 | 4.4 | 53.1 | 3000 |
| Comparative Example 6 | 4.4 | 49.1 | 4000 |
| Comparative Example 7 | 4.5 | 60.8 | 4000 |
| Comparative Example 8 | 4.8 | 48.2 | 2000 |
| Comparative Example 9 | 4.4 | 49.1 | No scumming |
| Comparative Example 10 | 4.5 | 49.0 | 3500 |

Note: Result of printing test shows the number of printed copies until scumming occurred.

It is apparent form Table 3 that when the additives for dampening solutions according to the present invention are used, printing can be effectively conducted without the occurrence of scumming. Further, the dampening solution of the present invention has surface tension lower than that of the dampening solution containing 3-methyl-3-methoxybutanol alone as the main additive component, and it remains in a homogeneous solution for a long period of time. Furthermore, the dampening solutions of the present invention have surface tension substantially equal to the dampening solution containing 5% by weight of IPA and it is also apparent from printing test results that the dampening solutions of the present invention have a printing performance substantially equal to that of the IPA-containing dampening solution.

It is understood from the above disclosures that the dampening solutions of the present invention can reduce surface tension to a level substantially equal to or lower than the level of surface tension lowered by the IPA-containing dampening solutions and can uniformly wet the non-image areas of the plate, and hence the dampening solutions of the present invention do not cause the occurrence of scumming during printing and have a printability at least equal to that of the IPA-containing dampening solutions. Accordingly, the additives for dampening solutions according to the present invention can be used as a substitute for IPA and allow the amount of IPA to be added to the dampening solutions to be greatly reduced or completely eliminated. Accordingly, printing working atmosphere can be improved and the costs of the dampening solutions can be reduced.

While the present invention has been described in detail and with reference to specific embodiments thereof, it is apparent to one skilled in the art that various changes and modifications can be made therein without departing from spirit and the scope of the present invention.

What is claimed is:

1. An additive for a lithographic dampening solution which comprises:

(a) a compound represented by the following formula (A):

$$R-O-(CH_2\overset{\overset{CH_3}{|}}{C}HO)_n-H \qquad (A)$$

wherein R represents a methyl group, an ethyl group, an n-propyl group or an isopropyl group, and n represents an integer of from 1 to 4; and (b) 3-methyl-3-methoxybutanol.

2. A dampening solution for lithographic printing, which comprises:

(a) from 0.01 to 5% by weight of a compound represented by the following formula (A):

$$R-O-(CH_2\overset{\overset{CH_3}{|}}{C}HO)_n-H \qquad (A)$$

wherein R represents a methyl group, an ethyl group, an n-propyl group or an isopropyl group, and n represents an integer of from 1 to 4;

(b) from 0.01 to 5% by weight of 3-methyl-3-methoxybutanol; and (c) water.

* * * * *